United States Patent [19]
McDonnell

[11] Patent Number: 5,785,476
[45] Date of Patent: Jul. 28, 1998

[54] FASTENER WITH SOFT TIP

[76] Inventor: Robert L. McDonnell, 10397 Overland Trail, Cherry Valley, Calif. 92223

[21] Appl. No.: 741,287

[22] Filed: Oct. 30, 1996

[51] Int. Cl.$^6$ .............................. F16B 15/00; F16B 35/02
[52] U.S. Cl. ......................... 411/383; 411/386; 411/493; 411/908
[58] Field of Search ........................ 411/392, 386, 411/424, 441, 448, 449, 493, 487, 383, 908

[56] References Cited

U.S. PATENT DOCUMENTS 2,968,984  1/1961  De Caro ........................... 411/441
3,439,575  4/1969  Gifford ............................ 411/386
3,516,323  6/1970  O'Brien ........................... 411/441

FOREIGN PATENT DOCUMENTS 2751067  5/1979  Germany ......................... 411/386

Primary Examiner—Neill R. Wilson

[57] ABSTRACT

A standard size fastener, such as a nail or screw, is provided with a pointed PVC or similar type material on the fastener tip. The soft end will penetrate wood but not metal materials, such as copper pipe and electrical conduit, when nailing sheathing or sheet rock onto wood framing. The soft front end will squash on impact with metal leaving a rounded blunt shape that will turn or stop when contacting a pipe.

4 Claims, 1 Drawing Sheet

FASTENER WITH SOFT TIP

BACKGROUND OF THE INVENTION

The construction industry for years has had a problem of nails and screws penetrating water lines and electrical conduits when nailing or screwing plywood or drywall to wood framing. Nails and screws will occasionally penetrate a water pipe and seal temporarily only to leak at a later date. Other leaks will occur immediately. Structural damage to the building can be severe in trying to get access to a damaged pipe for repairs.

Metal plates fastened to wood framing in the area of pipe and conduit are supposed to protect the pipe and conduit from damage. However, conventional nails and screws will sometimes penetrate the metal plates causing damage to pipe and conduit. Metal plates are not always in the area of nailing or screwing.

SUMMARY OF THE INVENTION

For solving the aforementioned problems of the prior art, a standard size fastener, such as a nail or screw, is provided with a soft tip which will penetrate the wood but not the metal material, such as copper pipe and conduit. The tip will squash on impact with metal leaving a rounded, blunt shape of nail or screw that will turn or stop when contacting a pipe or conduit. Soft tip nails and screws can be driven by pneumatic and electric drivers as well as hand-held hammers. Soft tip material will consist of a soft metal, PVC or other similar type of material.

DESCRIPTION OF PREFERRED EMBODIMENTS

The invention will be described in detail with reference to the drawings.

Figure 1:
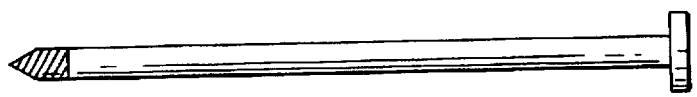
FIG. 1 shows a standard size nail with a soft end.

FIG. 1 shows a standard size fastener, such as a nail with a soft end which will penetrate wood, dry wall or plywood but not metal material, such as copper pipe or conduit. The soft end will squash on impact with metal leaving a rounded blunt or distorted shape when contacting a pipe or conduit.

Figure 2:
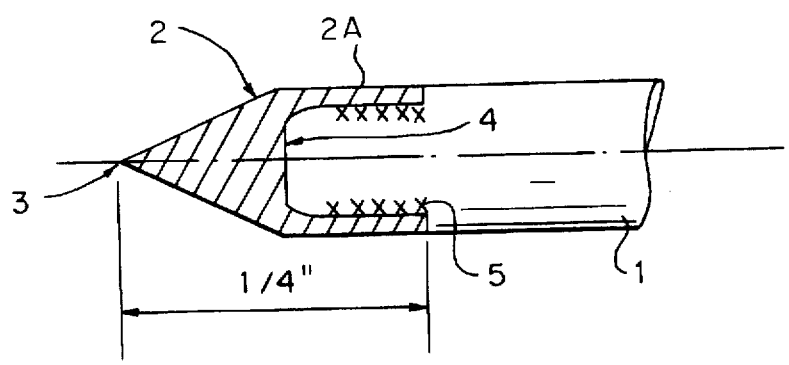
FIG. 2 shows a soft end nail in cross section.
Figure 3:
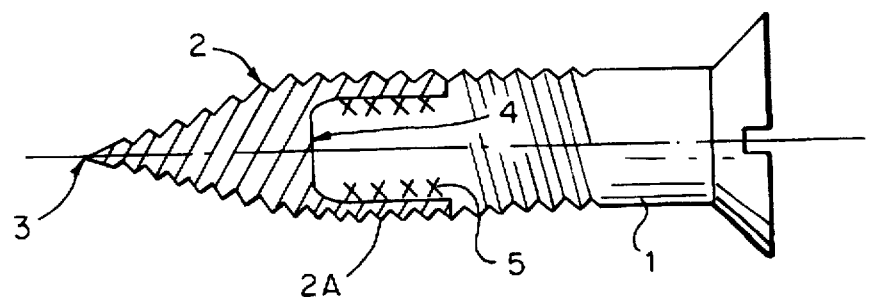
FIG. 3 shows a soft end screw in cross section.

FIGS. 2 and 3 show fasteners according to the invention in detail. The front end 4 of the fastener has a cylindrical portion, its diameter being reduced with respect to the conventional shank fastener. Preferably, the cylindrical front portion end of the fastener is rounded.

A PVC or similar material is bonded to the reduced diameter cylindrical portion. As shown in the figures, a tubular cylindrical portion (2A) has an outer diameter corresponding to the fastener shank diameter. A conical portion 2 extends from the tubular portion (2A), ending as a pointed tip. Alternatively, a pointed metal tip 3 can be provided. Preferably, the cylindrical front portion has its surface 5 serrated to improve the bonding of the PVC material.

The nails and screws according to the invention can be driven by pneumatic and electric drivers as well as a hand-held hammer.

I claim:

1. A fastener having a shank portion with a pointed penetrating end, and a predetermined outside diameter with a PVC material at its penetrating end, the fastener shank having a reduced diameter cylindrical front portion;

said PVC penetrating end having a tubular cylindrical portion and a conical extension with a pointed tip, the tubular cylindrical portion being bonded to the cylindrical front portion of the fastener shank portion, said tubular cylindrical portion having an outside dimension corresponding to the outside dimension of the fastener.

2. The fastener according to claim 1 wherein the pointed tip includes a metal cone bonded to the tip of the PVC conical extension.

3. The fastener according to claim 1, shaped as a nail.

4. The fastener according to claim 1, shaped as a screw.

* * * * *